(12) United States Patent
Kooima

(10) Patent No.: US 8,109,176 B1
(45) Date of Patent: Feb. 7, 2012

(54) CUTTING ELEMENTS WITH SERRATED CUTTING EDGE

(75) Inventor: Phillip Kooima, Rock Valley, IA (US)

(73) Assignee: Kooima Company, Rock Valley, IA (US)

( * ) Notice: Subject to any disclaimer, the term of this patent is extended or adjusted under 35 U.S.C. 154(b) by 0 days.

(21) Appl. No.: 12/760,170

(22) Filed: Apr. 14, 2010

(51) Int. Cl.
*B21K 11/00* (2006.01)

(52) U.S. Cl. .................................................. 76/104.1

(58) Field of Classification Search ................ 76/104.1, 76/101.1; 30/346, 350, 349, 346.6, 276; 241/222, 241, 37, 101.763; 172/747; 56/294, 56/255

See application file for complete search history.

(56) References Cited

U.S. PATENT DOCUMENTS

| | | | | |
|---|---|---|---|---|
| 2,867,137 | A | | 1/1959 | Joy |
| 3,635,271 | A | * | 1/1972 | Markham ...................... 241/222 |
| 3,851,450 | A | * | 12/1974 | Nelson ............................ 56/14.4 |
| 4,198,006 | A | * | 4/1980 | Rolfe ............................. 241/222 |
| 4,205,797 | A | * | 6/1980 | Bennett et al. ................ 241/222 |
| 4,357,817 | A | | 11/1982 | Lisinger |
| 4,376,793 | A | | 3/1983 | Jackson |
| 4,428,260 | A | | 1/1984 | Eby |
| 4,506,839 | A | * | 3/1985 | Black ..................... 241/101.763 |
| 4,563,867 | A | * | 1/1986 | Bokon ............................. 56/249 |
| 4,615,734 | A | | 10/1986 | Spriggs |
| 4,719,743 | A | * | 1/1988 | Bokon ............................. 56/294 |
| 4,724,299 | A | | 2/1988 | Hammeke |
| 4,896,424 | A | * | 1/1990 | Walker ............................ 30/349 |
| 5,027,592 | A | * | 7/1991 | Wieneke ......................... 56/249 |
| 5,160,822 | A | | 11/1992 | Aleshin |
| 5,622,638 | A | | 4/1997 | Schell |
| 5,884,465 | A | * | 3/1999 | Ibach et al. .................... 56/298 |
| 5,979,152 | A | * | 11/1999 | McCredie ....................... 56/298 |
| 5,997,248 | A | | 12/1999 | Ghasripoor |
| 6,510,681 | B2 | * | 1/2003 | Yang et al. ..................... 56/298 |
| 6,571,665 | B2 | * | 6/2003 | Julien ........................... 76/104.1 |
| 6,857,255 | B1 | * | 2/2005 | Wilkey et al. .................. 56/296 |

(Continued)

OTHER PUBLICATIONS

J. Arnold and R. Volz; "Laser Powder Technology for Cladding and Welding"; Journal of Thermal Spray Technology, pp. 243-248,vol. 8(2) Jun. 1999.

Steffen Nowotny et al., "Laser Beam Build-Up Welding: Precision in Repair, Surface Cladding, and Direct 3D Metal Deposition"; Journal of Thermal Spray Technology, pp. 344-348, vol. 16(3) Sep. 2007.

(Continued)

*Primary Examiner* — Arpad Fabian-Kovacs

(74) *Attorney, Agent, or Firm* — Jeffrey A. Proehl; Woods, Fuller, Shultz & Smith, PC

(57) ABSTRACT

A cutting system with enhanced wear resistance comprises a first cutting element having a first surface and a second surface, and a first cutting edge formed at an intersection of the first surface and the second surface. The first cutting element comprises a body with a first base surface and a second base surface intersecting the first base surface. The first base surface has an undulating contour character along the intersection of the first base surface and the second base surface. A layer of wear resistant material is applied to the first base surface of the body adjacent to the first cutting edge. The layer of wear resistant material has a substantially uniform thickness along the first cutting edge to transfer the undulating contour character of the first base surface to the first surface of the first cutting element to give the first cutting edge a serrated character.

20 Claims, 5 Drawing Sheets

U.S. PATENT DOCUMENTS

| | | | |
|---|---|---|---|
| 7,043,819 B1 * | 5/2006 | Arnold | 29/527.2 |
| 7,104,883 B2 * | 9/2006 | Dow | 460/112 |
| 7,124,567 B1 * | 10/2006 | Adamson et al. | 56/296 |
| 7,537,419 B2 * | 5/2009 | Sjoberg et al. | 407/103 |
| 7,543,387 B2 * | 6/2009 | Legrand | 30/276 |
| 7,644,568 B2 * | 1/2010 | Buchko | 56/249 |
| 2007/0039445 A1 * | 2/2007 | Nitsch | 83/835 |
| 2007/0261867 A1 | 11/2007 | Techel | |
| 2010/0071216 A1 * | 3/2010 | Novak | 30/162 |
| 2010/0325902 A1 * | 12/2010 | Dutta et al. | 30/346 |

OTHER PUBLICATIONS

E. Schubert et al.; "Laser Beam Cladding: A Flexible Tool for Local Surface Treatment and Repair"; Journal of Thermal Spray Technology, pp. 590-596, vol. 8(4) Dec. 1999.

M. Lugbauer et al., "Thermal Sprayed Coatings in High-Performance Agricultural Machinery: Properties and Wear-Behaviour Test Routine", Proceedings of the 2006 International Spray Conference, pp. 1345-1350, May 2006.

* cited by examiner

CUTTING ELEMENTS WITH SERRATED CUTTING EDGE

BACKGROUND

Field

The present disclosure relates to cutting elements and more particularly pertains to new cutting elements with serrated cutting edge for increasing the cutting operation efficiency while prolonging the useful life of the cutting elements.

SUMMARY

In view of the foregoing disadvantages inherent in the known types of cutting elements now present in the prior art, the present disclosure describes a new cutting elements with serrated cutting edge which may be utilized for increasing the cutting operation efficiency while prolonging the useful life of the cutting elements.

The present disclosure relates to a cutting system with enhanced wear resistance that may comprise a first cutting element having a first surface and a second surface, and a first cutting edge formed at an intersection of the first surface and the second surface. The first cutting element may comprise a body with a first base surface and a second base surface intersecting the first base surface. The first base surface has an undulating contour character along the intersection of the first base surface and the second base surface. The first cutting element may also comprise a layer of wear resistant material is applied to the first base surface of the body adjacent to the first cutting edge. The layer of wear resistant material may have a substantially uniform thickness along the first cutting edge to transfer the undulating contour character of the first base surface to the first surface of the first cutting element to give the first cutting edge a serrated character.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
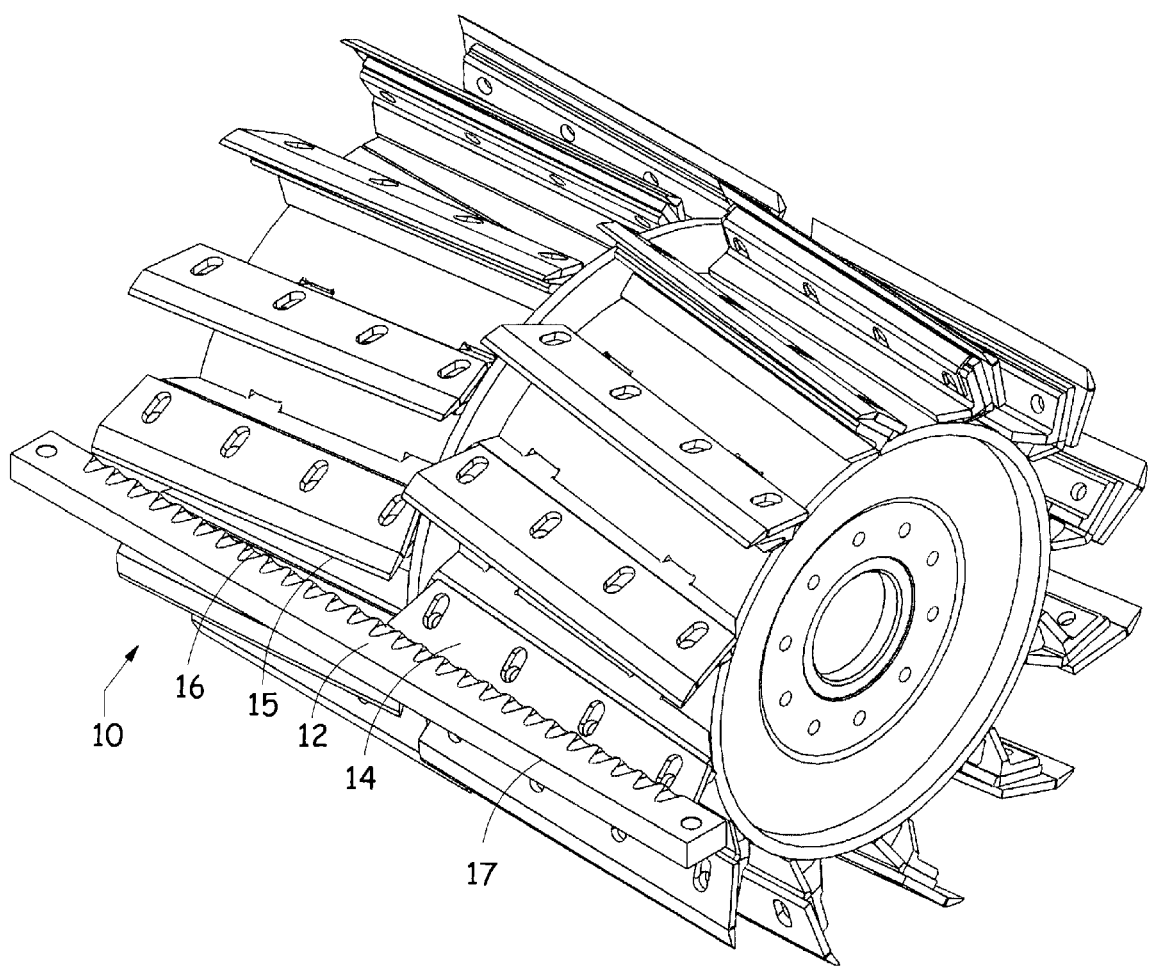
FIG. 1 is a schematic perspective view of the new cutting elements with serrated cutting edge according to the present disclosure, with a first cutting element (illustratively embodied as a shear bar) and a second cutting element (illustratively embodied as a cutter knife on a cutterhead assembly) that moves along the cutting edge of the first cutting element.
Figure 2:
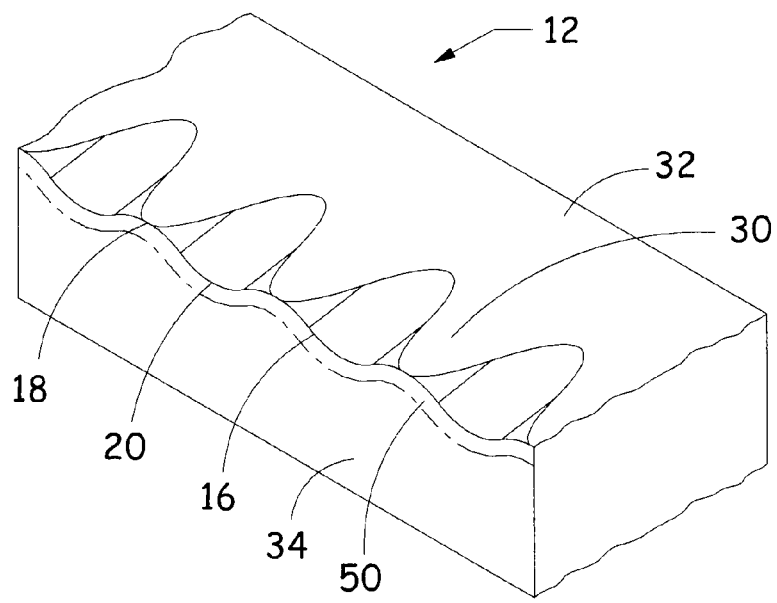
FIG. 2 is a schematic perspective view of a first cutting element as a cutting element with a serrated cutting edge, according to an illustrative embodiment.
Figure 4:
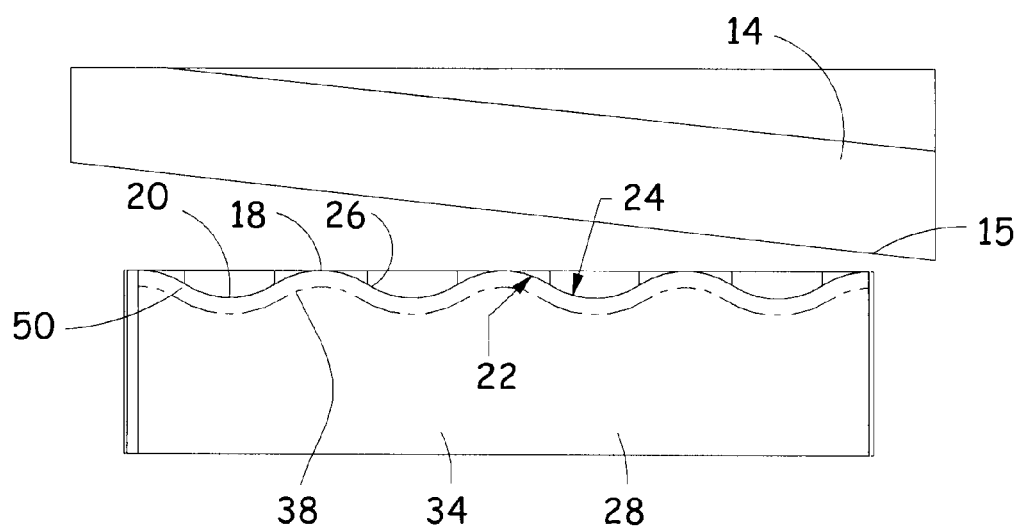
FIG. 4 is a schematic side view of the second surface of the first cutting element (illustrated as a shear bar), and showing the profile of a second cutting element (illustrated as a knife) in relation to the first cutting element.
Figure 3A:
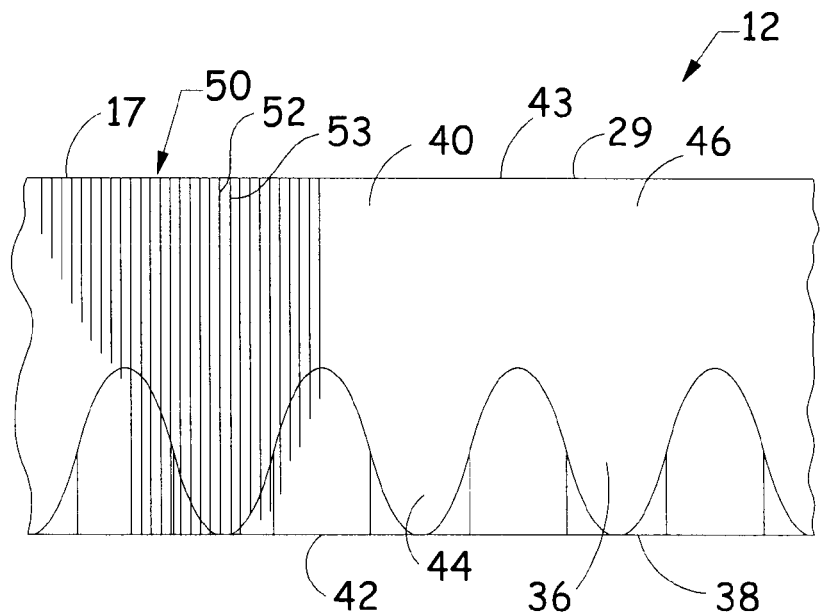
FIG. 3A is a schematic top view of a section of the body of the first cutting element with a portion of the first base surface covered by the layer of wear resistant material to form a first surface of the first cutting element (illustrated as a shear bar) showing an area of the lines of wear resistant material formed on the first base surface of the body with one illustrative orientation of the lines.
Figure 3B:
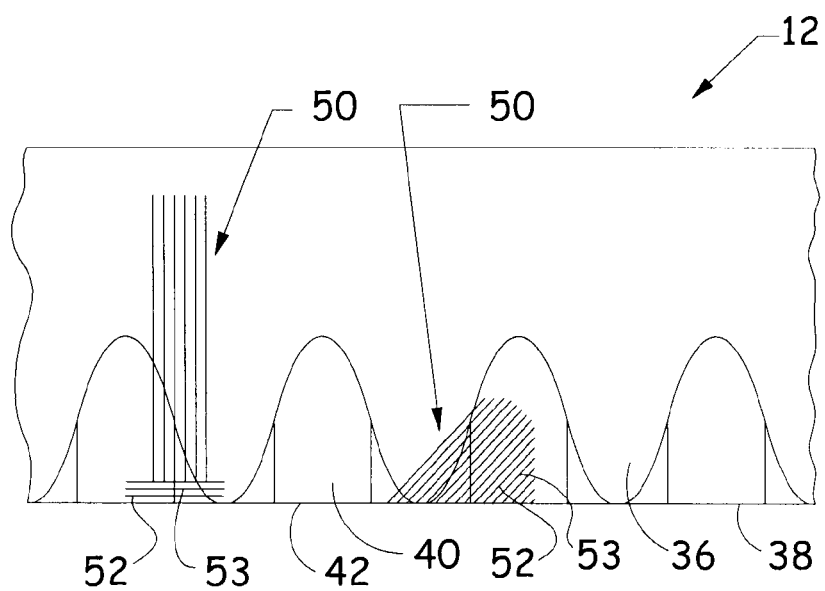
FIG. 3B is a schematic top view of a section of the body of the first cutting element with a portion of the first base surface covered by the layer of wear resistant material to form a first surface of the first cutting element (illustrated as a shear bar) showing an area of the lines of wear resistant material formed on the first base surface of the body with two other illustrative orientations of the lines.
Figure 5:
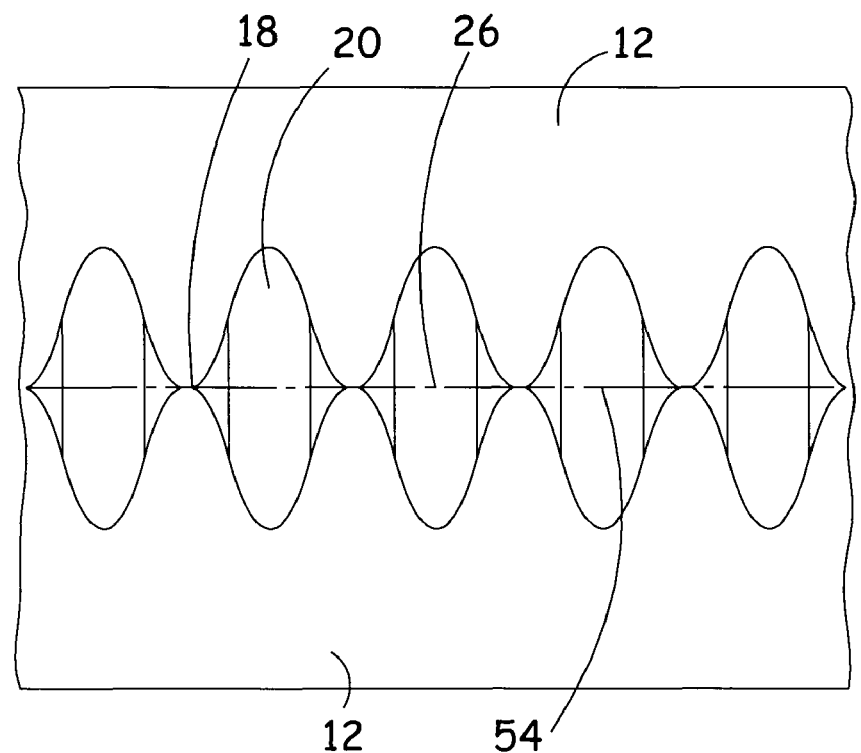
FIG. 5 is a schematic top view of an intermediate form of the first cutting element showing a pair of the first cutting elements formed in an opposed arrangement, with a broken line showing a line of separation between the pair to form two separate cutting elements.
Figure 6:
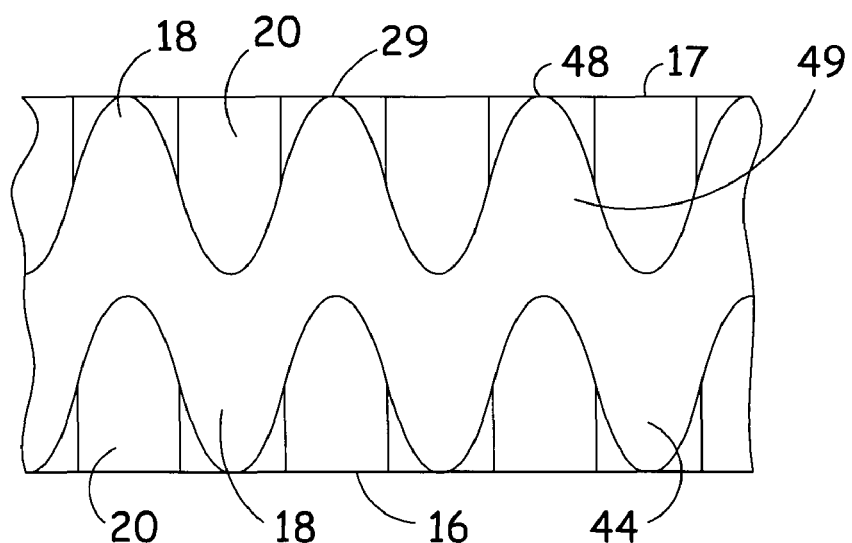
FIG. 6 is a schematic top view of an embodiment of the first cutting element with optional additional cutting edge.
Figure 7:
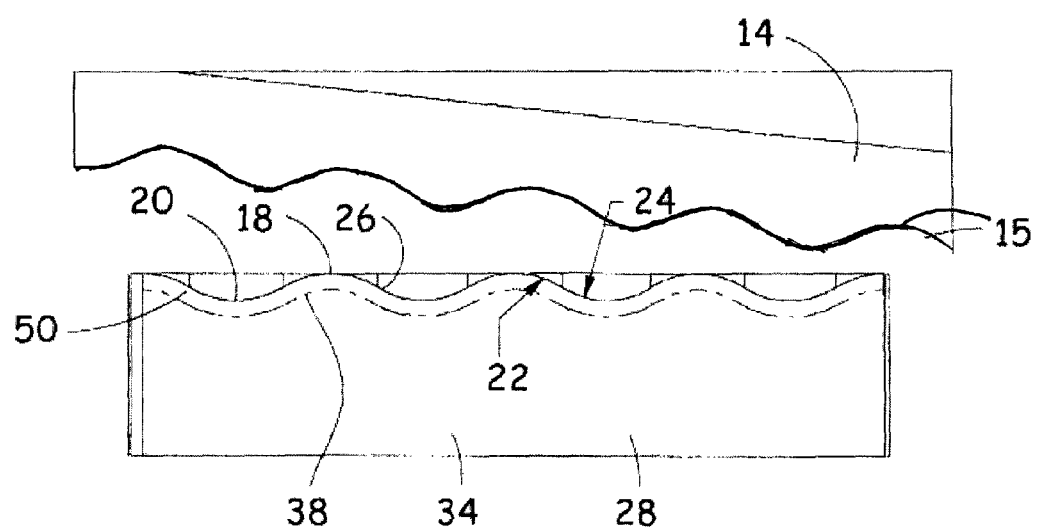
FIG. 7 is a schematic side view of the second surface of the first cutting element (illustrated as a shear bar), and showing the profile of a second cutting element (illustrated as a knife) having a serrated character in relation to the first cutting element.

With reference now to the drawings, and in particular to FIGS. 1 through 7 thereof, a new system of cutting elements with serrated cutting edge embodying the principles and concepts of the disclosed subject matter will be described.

The disclosure relates in general to a cutting system 10 which may exhibit enhanced wear resistance and enhanced performance. The features and elements of the disclosure may be utilized in a variety of applications. For the purposes of this description, the system 10 is described in terms of an agricultural wear part that comprises a shear bar for use on a harvester, and may also be applied to a knife that is used on the harvester to cut materials through movement of the knife against materials pinched between the knife and the shear bar. The usefulness of the system 10 and the components of the system are not so limited, and may be applied to other implements and apparatus.

The cutting system 10 may comprise a first cutting element 12 which may be mounted on a supporting structure, and may be supported in a relatively stationary position. The system 10 may also include a second cutting element 14 that is movable with respect to the first cutting element to cause cutting of a material by the elements 12 and 14. The first cutting element 12 may have a first cutting edge 16, while the second cutting element 14 may have a second cutting edge 15 which acts against the first cutting edge, such as by direct contact with the first cutting edge or movement close to the first cutting edge that tends to cut or shear materials that are lodged between the first 16 and second 15 cutting edges.

The first cutting edge 16 of the first cutting element 12 may be a serrated cutting edge. The first cutting edge 16 have a plurality of peaks 18 for contacting the material being cut, and each pair of adjacent peaks 18 may be separated by a valley 20 so that the first cutting edge 16 has alternating peaks and valleys. The peaks and valleys of the first cutting edge 16 may form a sinuous profile, and may have a smooth rising-and-falling alternation of the peaks and valleys.

Optionally, in some embodiments, the first cutting element 12 may include an additional cutting edge 17 that may be substantially similar to the first cutting edge 16. In some embodiments, the additional cutting edge 17 is situated on the first cutting element at a location that is substantially opposite of the first cutting edge so that the additional cutting edge is not utilized when the first cutting edge is being utilized with the second cutting edge 15, but reversal or repositioning of the mounting orientation of the first cutting element 12 on the supporting structure may move the additional cutting edge into a position where the additional cutting edge 17 is utilized with the second cutting edge and the first cutting edge is not utilized.

In greater detail, in some embodiments of the first cutting element the peaks may have a rounded profile with a first radius 22, and in some embodiments the first radius of each of the plurality of peaks is substantially similar or equal, although the first radius of the peaks may vary from peak to peak. In some embodiments, each of the valleys 20 may have a rounded profile with a second radius 24 and the second radius 24 of each of the plurality of valleys may be substantially similar or equal, although the second radius of the valleys may vary from valley to valley. Also in some embodiments of the first cutting element 12, the first radius 22 of the peaks 18 of the cutting edge 16 may be substantially similar or equal to the second radius 24 of the valleys 20 of the cutting edge. In some embodiments, an uppermost or outermost extent of the peak is not sharp, or the peak does not have a tip that is formed by the convergence of two linear or straight edge portions.

The first cutting edge 16 may be formed at an intersection of a first surface 26 of the first cutting element 12 and a second surface 28 of the first cutting element 12. The additional cutting edge 17, when utilized on the element 12, may be formed at an intersection of the first surface 26 and a third surface 29 of the element 12.

The first surface 26 of the first cutting element may include an undulating portion 30, which may form the peaks 18 and valleys 20 of the serrated or undulating first cutting edge 16. The undulating portion 30 may be located adjacent to the first cutting edge 16. The first surface 26 may also include a substantially planar portion 32. The undulating portion 30 may be located between the substantially planar portion 32 and the first cutting edge 16, and the undulating portion 30 may transition into the substantially planar portion. The height or amplitude or magnitude of the undulations of the first surface on the undulating portion 30 may decrease away from the first cutting edge 16 toward the substantially planar portion 32 such that the undulations are tapered smaller and smoothed out away from the first cutting edge 16. Optionally, the peaks and valleys of the undulations may extend from the first cutting edge 12 to the opposite edge (such as the additional cutting edge 17) without significant decrease in the height of the undulations. In some embodiments, the peaks 18 of the undulating portion do not extend through and above a plane defined by the substantially planar portion 32 of the first surface 26. In some embodiments, the peaks 18 of the undulating portion may lie substantially in the plane of the substantially planar portion 32.

In some embodiments, the difference in height between the top of the peaks and the base of the valleys of the first surface 26 at the first cutting edge 16 may be at least twice the thickness of a layer of wear resistant material of the element 12. Further, the difference may not be greater than approximately one-third the pitch (e.g., valley to valley) of the first surface 26.

In some embodiments, for the first surface 26 at the first cutting edge 16, the pitch or distance between the base of the valleys may be at least approximately 0.5 inches or greater, or may be approximately 2.5 inches or less. In some embodiments, the pitch may range from approximately 0.5 inches to approximately 2.5 inches, and some embodiments may have a pitch ranging from approximately 1 inch to approximately 2 inches, with an illustrative embodiment having a pitch of approximately 1.1 inches.

In some embodiments, for the first surface 26 at the first cutting edge 16, the difference in height between the base of the valley and the top of the peak is at least approximately 0.06 inches or greater, or may be approximately 0.375 inches or less. In some embodiments, the difference in height may range from approximately 0.06 inches to approximately 0.375 inches, and some embodiments may have a difference ranging from approximately 0.1 inch to approximately 0.3 inches, with an illustrative embodiment having a difference of approximately 0.17 inches.

In some embodiments, for the first surface 26 at the first cutting edge 16, the radius of the curvature of the peaks and/or valleys may be at least approximately 0.25 inches or greater, or may be approximately 1.14 inches or less. In some embodiments, the radius of curvature for the peaks and/or valleys may range from approximately 0.24 inches to approximately 1.14 inches, and some embodiments may have a difference ranging from approximately 0.5 inch to approximately 1.0 inch, with an illustrative embodiment having a radius of approximately 0.5 inches.

The second surface 28 of the first cutting element 12 may be substantially planar in shape, such that the undulations are limited to the first surface 26, although limiting the undulations to the first surface is not critical in some applications of the system 10. The third surface 29 may also be substantially planar in shape, and may not have any undulations in its surface. The relatively flat nature of the second and third surfaces may be suitable in applications in which a second cutting edge pair with the first cutting edge is linear or straight, although serrations on the second cutting edge may be employed and may be utilized with a second surface that also features serrations.

The first cutting element 12 may comprise a body 34 which may have at least one base surface 36, and may have at least one wear edge 38 that is located adjacent to the at least one surface. The wear edge 38 may be located adjacent to or close to the first cutting edge 16. The body 34 may have a first base surface 40 and a second base surface 42, and the surfaces 40 and 42 may be oriented in a substantially perpendicular relationship, although this relationship is not critical. The first 40 and second 42 base surfaces may intersect at the wear edge 38. The wear edge 38 may form an undulating, sinusoidal shaped line. The first base surface 40 may include an undulating section 44 that may generally correspond to the undulating portion 30 of the first surface 26 of the first cutting element 12 and may be located along the wear edge 38. The second base surface 42 may generally form the second surface 28 of the first cutting element. The body 34 may have a third base surface 43 that intersects the first base surface 40 at another wear edge 48, and the first and third surfaces may be orientated in a substantially perpendicular relationship, although this relationship is not critical.

In embodiments such as those in which there is no additional cutting edge 17 with a serrated character, the first base surface 40 may further include a substantially planar section 46 that may generally correspond to the substantially planar portion 32 of the first surface 26 of the first cutting element 12. In embodiments that include an additional cutting edge 17, the substantially planar section 46 may be omitted, and another undulating section 49 may be positioned along the additional cutting edge 17. In some implementations, the undulations of the undulating section 44 may alternate with the undulations of the another undulating section 49 (see FIG. 6).

The first cutting element 12 may include a layer of wear resistant material 50 formed on the first base surface 40 of the body 34. The layer of wear resistant material may extend over the undulating section 44 of the first base surface 40, and may extend over the substantially planar section 46 of the first base surface. In embodiments employing another wear edge, the layer 50 may extend over the another undulating section 49. In many preferred embodiments, the layer 50 does not extend over the second base surface 42, and the third base surface 43.

The layer 50 of wear resistant material may be formed of a plurality of lines 52 of wear resistant material deposited on the first base surface 40 of the body. Each line 52 of wear resistant material deposited on the body 34 may overlap at least one adjacent line 53 of wear resistant material deposited on the body. The lines 52, 53 of wear resistant material may overlap to a degree such that the first base surface 40 of the body is covered by the layer of wear resistant material, and may extend to the wear edge 38. The overlap of the lines 52, 53 of wear resistant material may be of a degree such that there is no significant variation in a thickness of the wear layer across and between the lines, and may produce a surface on the first surface that does not exhibit any significant grooves or variations that are not caused by or a result of the variations in the first base surface of the body 34.

The lines of wear resistant material may extend in an orientation that is substantially perpendicular to the orientation of the cutting edge, and the lines may also extend in an orientation that is substantially parallel to the cutting edge. Further, the lines of deposited wear resistant material may also extend in an orientation that is angled with respect to the cutting edge at an angle that is greater than zero and less than approximately 90 degrees.

The lines 52, 53 of wear resistant material may be oriented substantially parallel to each other, although not all of the lines of the wear resistant material need to be parallel, or even substantially parallel, to each other. In some embodiments, one or more lines of wear resistant material may be deposited on the body at a non-zero angle with respect to another line or lines of the layer, and the angle may be as much as approximately 90 degrees so that lines are oriented substantially perpendicular to each other. For example, one or more lines of the wear resistant material at the first cutting edge 16 may extend substantially parallel to the cutting edge 16, while other lines of the wear resistant material away from the cutting edge may extend substantially perpendicular to those lines parallel to the cutting edge.

The layer 50 of wear resistant material may have a thickness that is measured in a direction that is substantially perpendicular to a portion of the first base surface 40. In some embodiments, the thickness of the layer 50 on the first base surface is substantially uniform and does not vary significantly. The thickness of the layer may be substantially uniform over the undulating section 44 and the substantially planar section 46 of the first base section 40. As a result, in at least some embodiments, the contour of the first surface 26 follows and may substantially duplicate the first base surface 40. Therefore, it should be recognized from the foregoing description that the serrated or undulating character of the first surface 26 is substantially entirely produced by the shaping of the first base surface 40, and not by any significant variation in the character (e.g., thickness) of the layer of wear resistant material. The substantially uniform thickness of the layer 50 communicates or transfers the contouring of the first base surface to the first surface.

The layer 50 may be formed of a material with a degree of wear resistance that is greater than a degree of wear resistance of a material forming the body 34, and it is contemplated that the wear resistant material is not immune to wear but is more resistant to wear than the material of the body, at least at the first cutting edge. The layer of wear resistant material may include at least one material that is different than the material or materials forming the body, and may include at least two materials that are different than the material forming the body. The material or materials of the layer may comprise materials such as carbide particles and nickel-chromium filler.

The layer 50 of wear resistant material may include at least one material that is different than the material forming the body 12 of the wear part. In some implementations, the layer 50 of wear resistant material may include at least two materials that are different than the material forming the body 12. In this way, the layer 50 may be formed of a composition that is significantly harder, or at least more wear resistant, than the composition of the material forming the body 34. In one highly preferred embodiment, the layer 50 is formed from a material including carbide particles, which provide a significantly increased wear resistance to the layer, especially in comparison to the material of the body of, for example, medium range carbon steel. Illustratively, but not necessarily, the carbide particles may comprise spherical, gas-atomized and re-sintered tungsten carbide particles, and may have a size range of approximately −150 microns to approximately +45 microns. The layer 50 thus comprises the material of the body 34 and the one or more materials added.

Additional materials may be included in the layer 50 of wear resistant material, including nickel, cobalt, or iron based alloy filler. Illustratively, but not necessarily, the additional materials may comprise a water-atomized alloy particle composed of nickel, chromium, boron, silicon, and iron at a size range of approximately −125 to approximately +45 microns. The materials of the layer may be blended in the application process described below.

Significantly, the chemistry and shape of the tungsten carbide particles may provide three important conditions that result in improved impact and wear resistance over a coating with an identical density of angular carbides: 1) more involved surface alloyment of carbide to the nickel-chromium alloy filler; 2) a larger bond surface of the exposed carbides at the working surface of the coating; 3) a more uniform thickness of filler between particles; and 4) a harder phase of carbide. The exterior shape of the carbide particles may be spherical or may be angular, in the form of WC/W2C. One suitable product for forming the layer is sold under the tradename "NT60" which may be obtained from Carpenter Powder Products (CPP) of Bridgeville, Pa.

In the most preferred implementations of the system 10, the layer of wear resistant material may be formed using a laser to liquefy a portion of the material of the body 34 on the first base surface on which the layer 50 is to be formed. Into the liquefied material of the body, the different material or materials are injected to form a layer on the body that is fully integrated into the structure of the body 34. More specifically, the laser creates an initial liquefaction of the first surface 40 of the body into which is injected the powdered forms of the different materials (such as the aforementioned tungsten carbide and nickel-chromium filler) that results in a liquid pool forming on the first surface at the beam termination. The liquid pool may be shrouded with inert gases to prevent oxidation of the elements at the high temperatures present. The laser beam may be moved across the first surface 40 to create the layer 50 across the first surface. Trailing the laser beam, the alloy pool of the materials of the layer 50 rapidly solidifies into a fully dense, homogenous amalgamation of the materials, such as the tungsten carbides in a nickel-chromium filler, with a precise bead cross-section. The integration of the material or materials of the layer may be integrated to such a degree that the layer may be difficult to distinguish but for the presence of the materials of the layer that are different from the materials of the body 34.

In greater detail, the laser may be provided by a machine platform that provides laser metal deposition (LMD) in a highly controlled manner. Illustratively, the source of the laser may be a 5 kW $CO_2$, induction amplified, beam generator. The beam may be delivered to a machine platform through a focusable optics system. Optionally, but preferably, the machine platform is able to perform three laser-powered thermal processes, including metal/carbide deposition, material cutting, and metal welding. The materials added to the layer 50 of wear resistant material (other than the base material of the body 34 that is liquefied by the laser) may be delivered to the point of liquefaction as a powder by a powder pickup and delivery system. The powder pickup and delivery system may be a high-volume, closely metered, groove-and-wiper arrangement commonly used in thermal spray systems, although it is possible that other delivery system may be employed. The delivery system may include an integrated nozzle that matches the focus of the laser beam to the powder delivery target at all axes of operation. The system may include dedicated process control optimized for all three laser processes. Optionally, the machine platform may operate in six axes. Machines suitable for the purposes of the invention are available, for example, from TRUMPF Laser and Systemtechnik GmbH, Johann-Maus-Strasse 2, D-71254 Ditzingen, Germany, although other sources may be available.

Advantageously, the resulting layer 50 may be formed with a substantially crack-free character and without the significant porosity that is normally encountered with weld and thermal spray coating processes generally employed for wear parts such as shear bars. Significantly, the intense energy of the laser source limits the involvement of the subsurface material of the body 34 in the liquid pool, and since relatively less of the base material is mixed with the alloying materials of the layer 50, the density of the alloying materials (such as the nickel-chromium filler alloy and the carbide) in the layer is vastly increased. The fraction of the carbides in the layer 50 exceeds the 50% density limit of carbides in a coating formed by thermal spray coating systems. In some embodiments, a density of greater than 70% carbide in the layer 50 has been achieved. Further, the metallurgical bond achieved by the high temperatures within the liquid pool results in bond strength that otherwise might only be achieved by weld processes, and far exceeds bond strengths achieved by other thermal spray coatings. This significant bond strength results in a substantial level of impact resistance of the layer 50. The dimensional precision of the cross-section of the deposited beads, and the highly controllable energy output of the laser beam, allow for overlapping travel movement of the laser that results in a highly accurate and consistent deposit thickness over a large surface, including surfaces in 3 dimensions.

Optionally, the first cutting element may be subjected to surface grinding, both before and/or after the deposit of the layer 50 on the body, to achieve a sharp cutting edge and surface straightness required in the equipment for which the first cutting element is designed to be installed.

In those embodiments of the first cutting element that include the first cutting edge 16 and the additional cutting edge 17 on the element 12, it may be desirable to reverse the position of the cutting element 12 in its mounting on the intended machine to permit the cutting edges 16, 17 to be used alternately. Illustratively, a shear bar formed according to the disclosure with the first 16 and additional 17 cutting edges may be positioned in the mounting of the machine to utilize the first cutting edge initially, and when the first cutting edge has been worn to the point that it is not longer suitably effective, then the shear bar may be reversed in position in the mounting so that the additional cutting edge is made available for use.

The second cutting element 14 of the system 10 may be movable with respect to the first cutting element 12 and cause cutting of material as a result of the movement of the cutting edges 15, 16 with respect to each other. In some embodiments, the second cutting element 14 is moved and the first cutting element remains substantially stationary, although this relationship is not critical. The second cutting edge 15 may be angled with respect to the first cutting edge 16 of the first cutting element (see, for example, FIG. 4) when the elements are mounted for use, and the second cutting edge may be movable along the first cutting edge. In the illustrative application of the disclosure, the second cutting element 14 may comprise a knife that is employed on a drum or other structure that moves the knife by the shear bar.

The second cutting edge 15 of the second cutting element 14 may have a serrated character as described above (see FIG. 7), or may have a more linear character (see FIG. 4), so that the serrated first cutting edge may be paired with a serrated second cutting edge, or the serrated first cutting edge may be employed with a substantially straight second cutting edge.

Optionally, the first cutting element 12 may be formed in a manner as follows. A block of the material utilized for the body 34 and approximately twice the width of the finished cutting element may be obtained, and may be contoured with valleys such as is illustratively depicted in FIG. 5. The valleys formed in the preliminary body may be confined to a medial area of the first base surface 40 so that the valleys do not extend to the edges of the material for the body. The layer 50 of wear-resistant material may be applied to the first base surface of the block in the manner described above or in another manner. Upon completion of the layer 50, the block of material may be cut longitudinally along a plane 54 that bisects the valleys and peaks formed on the first surface, so that two parts are formed that are substantially mirror images of each other.

An advantage of the serrated or undulating cutting edge on the cutting element is an increased edge length as compared with a straight cutting edge, which provides a mechanical advantage over opposing straight cutting edges where an equal ratio of edge lengths provides no mechanical advantage. A further advantage of utilizing at least one undulating cutting edge is a resistance to sliding along the cutting edge of the material being cut, which can be a disadvantage of opposed straight cutting edges that allow material migration along the edge, especially where the edges are oriented at skewed angles with respect to each other.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A cutting system with enhanced wear resistance, the system comprising:
    a first cutting element having a first surface and a second surface, a first cutting edge being formed at an intersection of the first surface and the second surface, the first cutting element comprising:
        a body with a first base surface and a second base surface intersecting the first base surface, the first base surface having an undulating contour character along the intersection of the first base surface and the second base surface; and
        a layer of wear resistant material applied to the first base surface of the body adjacent to the first cutting edge;
        wherein the layer of wear resistant material has a substantially uniform thickness along the first cutting edge to transfer the undulating contour character of the first base surface to the first surface of the first cutting element to give the first cutting edge a serrated character.

2. The cutting system of claim 1 wherein the first cutting edge includes alternating peaks and valleys.

3. The cutting system of claim 1 wherein the first cutting edge has a sinuous profile.

4. The cutting system of claim 1 wherein the first surface of the first cutting element includes an undulating portion located adjacent to the first cutting edge to form peaks and valleys of the first cutting edge.

5. The cutting system of claim 4 wherein the first surface includes a substantially planar portion with the undulating portion of the first surface being located between the substantially planar portion and the first cutting edge, the undulating portion including a transition into the substantially planar portion.

6. The cutting system of claim 5 wherein a magnitude of the undulations of the first surface of the undulating portion decreases away from the first cutting edge toward the substantially planar portion such that the undulations are smoothed out away from the first cutting edge.

7. The cutting system of claim 5 wherein the peaks of the undulating portion do not extend above a plane of the substantially planar portion of the first surface.

8. The cutting system of claim 1 wherein the second surface of the first cutting element is substantially planar at the first cutting edge.

9. The cutting system of claim 2 wherein each of the peaks has a rounded profile with a first radius.

10. The cutting system of claim 2 wherein each of the valleys has a rounded profile with a second radius.

11. The cutting system of claim 2 wherein each of the peaks has a rounded profile with a first radius and each of the valleys has a rounded profile with a second radius, the first radius of the peaks of the cutting edge being different from the second radius of the valleys of the cutting edge.

12. The cutting system of claim 1 wherein the second base surface of the body substantially forms the second surface of the first cutting element.

13. The cutting system of claim 1 wherein the first cutting element includes an additional cutting edge formed at an intersection of the first surface and a third surface of the first cutting element, the additional cutting edge being located opposite of the first cutting edge on the first surface.

14. The cutting system of claim 1 wherein the layer of wear resistant material is formed by a plurality of lines of wear resistant material deposited on the first surface of the body.

15. The cutting system of claim 14 wherein each line of wear resistant material overlaps at least one adjacent line of wear resistant material such that the first base surface of the body is covered by the layer of wear resistant material at the first cutting edge without a significant degree of variation in the thickness of the layer of wear resistant material.

16. The cutting system of claim 1 additionally comprising a second cutting element with a second cutting edge, the first cutting element and the second cutting element being movable with respect to each other such that material positioned between the first cutting edge and the second cutting edge are cut between said edges.

17. The cutting system of claim 16 wherein the second cutting edge of the second cutting element is substantially linear.

18. The cutting system of claim 16 wherein the second cutting edge of the second cutting element has a serrated character.

19. The cutting system of claim 16 wherein the first cutting element comprises a shear bar for use on a harvester, and the second cutting element comprises a knife for use on a harvester in opposition to the shear bar.

20. A cutting system with enhanced wear resistance, the system comprising:
    a shear bar cutting element having a first surface and a second surface, a first cutting edge being formed at an intersection of the first surface and the second surface, the shear bar cutting element comprising:
        a body with a first base surface and a second base surface intersecting the first base surface, the first base surface having an undulating contour character along the intersection of the first base surface and the second base surface; and
        a layer of wear resistant material deposited on the first base surface of the body adjacent to the first cutting edge, the layer including a carbide material deposited on the first base surface using laser deposition;
        wherein the layer of wear resistant material has a substantially uniform thickness along the first cutting edge to transfer the undulating contour character of the first base surface to the first surface of the first cutting element to give the first cutting edge a serrated character.

* * * * *